United States Patent [19]

Nolte et al.

[11] Patent Number: 5,419,298

[45] Date of Patent: May 30, 1995

[54] INTERNAL COMBUSTION ENGINE

[75] Inventors: Albert Nolte, Cologne; Toni Kleinschmidt, Bruehl, both of Germany

[73] Assignee: Klöckner-Humboldt-Deutz AG, Cologne, Germany

[21] Appl. No.: 285,492

[22] Filed: Aug. 3, 1994

Related U.S. Application Data

[63] Continuation of Ser. No. 977,669, Nov. 18, 1992, abandoned.

[30] Foreign Application Priority Data

Nov. 21, 1991 [DE] Germany .................. 41 38 290.0

[51] Int. Cl.$^6$ ............................................. F02M 37/06
[52] U.S. Cl. ..................................... 123/508; 123/509
[58] Field of Search ............... 123/508, 509, 495, 501, 123/500

[56] References Cited

U.S. PATENT DOCUMENTS

| | | | |
|---|---|---|---|
| 1,949,470 | 3/1934 | Hesselman | 123/508 |
| 2,000,555 | 5/1935 | Becker | 123/508 |
| 4,054,108 | 10/1977 | Gill | 123/509 |
| 5,081,970 | 1/1992 | Matsuoka | 123/508 |
| 5,083,544 | 1/1992 | Brighigna | 123/508 |
| 5,083,545 | 1/1992 | Yamashita | 123/509 |
| 5,201,300 | 4/1993 | Iiyama | 123/508 |

FOREIGN PATENT DOCUMENTS 3910794 10/1990 Germany ..................... 123/503

*Primary Examiner*—Carl S. Miller
*Attorney, Agent, or Firm*—Charles L. Schwab; Hardaway Law Firm

[57] ABSTRACT

A fuel injection pump element 15 is mounted in an engine crankcase (1) adjacent its associated cylinder 9, and in substantially parallel orientation thereto so that the high pressure outlet 20 of the injection pump element 15 is close to the injection valve 13 thus permitting a very short injection line 21. Mounting the fuel injection pump element 15 within the crankcase provides a very rigid mechanical support therefor. Use of a very short fuel injection line provides superior hydraulic rigidity as is required for achieving high injection pressures. A special bushing 31 with fuel passage may be used to mount the pump plunger bushing 19. The special bushing 31 may be made of high quality material of low porosity to add strength and avoid fuel leakage that may otherwise occur because of the porosity of the case iron crankcase.

28 Claims, 5 Drawing Sheets

INTERNAL COMBUSTION ENGINE

This application is a continuation of application Ser. No. 07/977,669, now abandoned filed Nov. 18, 1992.

TECHNICAL FIELD

This invention relates to an internal combustion engine having a fuel injection system with a cam operated injection pump element for each engine cylinder.

BACKGROUND OF THE INVENTION

Such an internal combustion engine is known from German patent document DE-OS 39 10 794. This internal combustion engine exhibits a crankcase in which there is arranged a camshaft, which actuates the plunger of an injection pump element via a roller tappet. The injection pump element and the roller tappet are inserted directly into the crankcase of the internal combustion engine. By this means, a separate case for the injection pump element can be dispensed with. Similarly, the otherwise necessary mounting of the pump case on the crankcase is omitted. Thus the design and the installation of the injection pump element is simplified and a cost saving is achieved. What is more, by means of the omission of the case for the injection pump element, space is created for a rigid injection pump element construction having the associated hydraulic advantages.

OBJECTS AND BRIEF SUMMARY OF THE INVENTION

It is an object of the invention further to improve the known internal combustion engine and further to optimize the injection device in the direction of mechanical and hydraulic rigidity.

In accordance with the invention, this object is achieved by virtue of the fact that the camshaft is driven from the crankshaft via a single meshing, that the injection pump element is arranged in the region of the assigned cylinder in the crankcase and oriented toward the cylinder head, and that the high-pressure outlet of the injection pump is adjacent to the injection valve along the shortest path. In logical development of the generic injection pump element, this design creates an injection device that is mechanically and hydraulically very rigidly designed, from the camshaft drive through the arrangement and orientation in the crankcase, up to the arrangement of the high-pressure outlet as near as possible to the injection valve, and that further improves the injection properties of the internal combustion engine in accordance with the invention relative to the prior art. An exactly definable and controllable injection behavior is important particularly with regard to a low fuel consumption and a favorable emission behavior of the internal combustion engine. Both the exhaust-gas emissions of the internal combustion engines and their noise emissions, to the extent that they are influenced by the injection device, are reduced. In particular, by means of the drive of the camshaft from the crankshaft via a single meshing, rotations of the camshaft relative to the crankshaft, which occur in known camshaft drives via a plurality of gears, toothed belts, or chains, and which lower the attainable peak pressure, are avoided. The arrangement of the injection pump element in the region of the assigned cylinder in each case and the orientation toward the cylinder head makes possible a short injection line having small dead volume and thus high hydraulic rigidity, as is required for the attainment of high injection pressures.

In development of the invention, the injection valve is arranged in the cylinder head tilted toward the injection pump element. In further development, the injection valve can be displaced off the cylinder axis toward the injection pump element. By this means, the injection line can be made shorter and shorter, and the previously described advantages of a short injection line can be achieved to a greater extent.

In development of the invention, the crankcase exhibits a bushing into which the injection pump element is inserted, said injection pump element lying with a flange against the bushing. This bushing, which does not represent a case for the injection pump element, is advantageously fabricated from a higher-quality material than the crankcase. In accordance with the invention, the bushing can be separately fabricated for each injection pump element of a multi-cylinder internal combustion engine, or, however, a plurality of bushings can be connected to one another by means of at least corresponding connecting webs or designed as a block. On the one hand, the rigidity of the crankcase is further increased by means of the insertion of the bushing, since the bearing surfaces of the rigid injection pump element is further increased relative to the less rigid crankcase by means of the interposition of the bushing; on the other hand, possible cavitation problems upon the spilling of fuel into the low-pressure fuel space of the crankcase are avoided. What is more, fuel leakage due to casting defects in the gray cast iron of the crankcase are eliminated by means of the bushing. Furthermore, it is also provided in accordance with the invention to provide a further bushing in the region of the roller tappet, which further bushing contributes to a stiffening of the whole system in similar fashion to the described bushing of the injection pump element. Likewise, it is provided to connect these two bushings to each other if appropriate, at least by means of webs.

In development of the invention, the injection pump element is designed as a solid of revolution and exhibits an annular flange. This design makes possible a distortion-free attachment of the injection pump element in the crankcase, by which means galling of the plunger is avoided. What is more, by means of the symmetrical design, a uniform hardening of the injection pump element body is enabled, and thus likewise the galling tendency of the plunger moving in the body is diminished.

The crankcase of the internal combustion engine, in further development of the invention, is designed in box fashion in the region of the injection pump element. This box-like design represents a further step toward increasing the rigidity of the whole system. In development, this box-like structure is designed particularly rigidly by means of the choice of wall form and wall design, in particular in the direction of the transverse load and in the direction of the longitudinal load caused by the cam of the camshaft. At least one upper girder of the box is arranged in the region of the injection pump element, and at least one lower girder of the box is arranged in the region of the roller tappet. The wall thickness of each of these girders is designed such that it corresponds, at least in the region of the roller tappet and of the injection pump element, to half the height of the roller tappet in the one case and to half the height of the injection pump element in the other case.

In development of the invention, the camshaft drive gearing is arranged at the flywheel end of the internal combustion engine. The smallest torsional vibrations that might propagate to the camshaft occur in this end region of the crankshaft. The teeth of the camshaft drive gearing are designed in the long-tooth system. Long-tooth gearing increases the contact ratio of the teeth of the drive gearing, by which means the noise emission of said teeth is diminished.

Through the covering of the injection valve by means of a hood, the noise emission of said injection valve is reduced. The solid-borne sound of the injection line is held away from the hood by means of a rubber seal of the pass through of the injection line under the hood, and thus the noise emission of said injection line is minimized.

It is advantageous that, between the cam of the camshaft and a pump plunger of the injection pump element, there are provided the roller tappet and, if appropriate, a spring plate and a plunger push rod, the dimensions of which are selected such that the flange is arranged above the crankcase. Because the high-pressure space of the injection pump and thus the top dead center point of the pump plunger are arranged in the region of the flange, their nearness to the high-pressure port of the injection valve is insured. In this fashion, the distance between the camshaft and the high-pressure port of the injection valve is bridged chiefly by means of rigid mechanical elements (roller tappet, spring plate, plunger push rod, pump plunger) and only in small part by less rigid hydraulic elements (injection line). By this means, a high overall rigidity required for high-pressure injection is imparted to the injection system in accordance with the invention.

A pump plunger and a plunger push rod that are designed in one piece simplify the fabrication and assembly of the pump element.

Naturally, the arrangement of the injection device in accordance with the invention can also be realized with conventional modular pumps. Here the injection pump element is arranged in a pump case. These pump cases can be arranged chiefly in the crankcase of the motor, or can be arranged partially in and partially on said crankcase and exhibit an external fuel supply. This arrangement offers the advantage that the high-pressure space of the injection pump elements extends especially close to the high-pressure port of the injection valve. What is more, the danger of fuel heating and fuel leakage inside the crankcase is avoided by means of the external fuel supply.

Further advantageous developments of the invention can be taken from the description of the Drawings, in which exemplary embodiments of the invention illustrated in the Figures are described more closely.

BRIEF DESCRIPTION OF THE DRAWINGS

Referring to FIG. 1, the crankcase 1 is designed for a four-cylinder water-cooled auto-ignition internal combustion engine. A crankshaft, not shown, drives a camshaft 2 via a single meshing. The camshaft drive gearing 3a, 3b is arranged on the flywheel end of the internal combustion engine. The camshaft drive gearing 3a, 3b has teeth in the long-tooth system, which insure low-noise transmission of the rotary motion. Between successive bearing disks 4a, 4b, the camshaft 2 has cams 5a, 5b, 5c, which fill out the region between the bearing disks 4a, 4b without leaving a gap and form a continuous unit that exhibits no separating grooves. The cams 5a, 5c actuate the breathing valves of the internal combustion engine via push rods, not illustrated, while the cam 5b actuates an injection pump element 7 via a roller tappet 6. The injection pump element 7 is mounted on the crankcase 1 of the internal combustion engine with a mounting means 8. Each cylinder of the internal combustion engine has its own injection device, which is arranged laterally next to the cylinder concerned.

Figure 1:
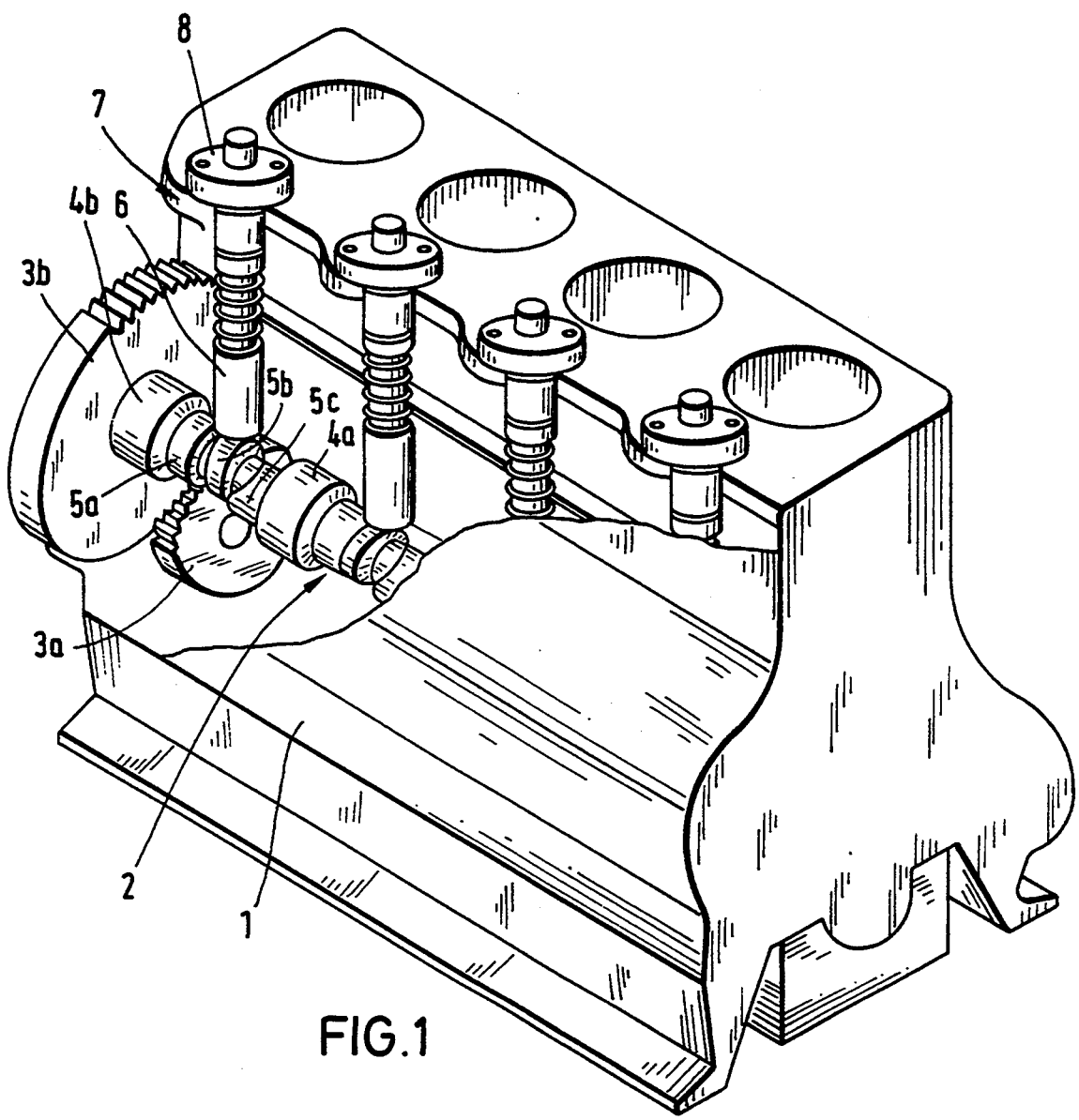
FIG. 1 shows a view of the crankcase of the internal combustion engine with the camshaft drive.
Figure 2:
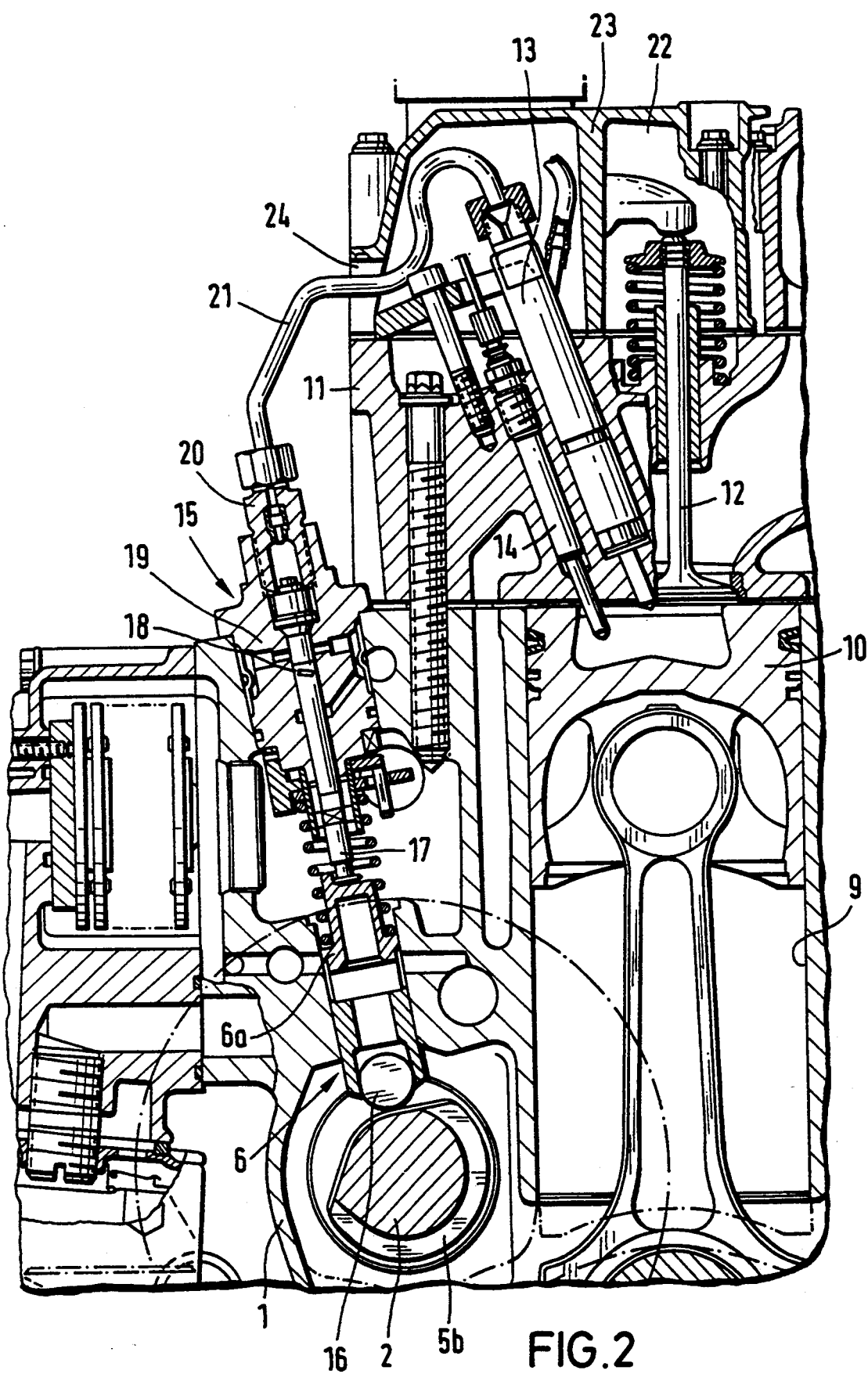
FIG. 2 shows a cross section through the crankcase and the cylinder head having the injection device.

The cross section through the crankcase 1 in FIG. 2 shows a cylinder 9 in which a piston 10 has moved to the top dead center point. The crankcase 1 is covered by a cylinder head 11 in which breathing valves 12, an injection valve 13 and a pencil-type glow plug 14 are arranged. The injection valve 13 is displaced off the cylinder axis toward an injection pump element 15 and is likewise arranged in the cylinder head 11 tilted toward the injection pump element 15.

The camshaft 2 is arranged to the side of the cylinder 9 above the crankshaft. On the cam 5b of the camshaft 2, a roller tappet 6 with a roller 16 rolls, which roller tappet actuates a plunger push rod 17. The plunger push rod 17 is designed in operative connection with a pump plunger 18 or, respectively, as a common component. The pump plunger 18 is guided in a plunger bushing 19, said plunger bushing 19 and the pump plunger 18 forming the essential components of the injection pump element 15. The high-pressure outlet 20 of the injection pump element 15 is connected via an injection line 21 to the injection valve 13 along the shortest path. A breathing valve space 22 is covered oil-tight by a hood 23, said hood 23 additionally covering the injection valve 13 and at least a part of the injection line 21. The entry point 24 of the injection line 21 into the hood 23 is sealed in noise-insulating fashion. It is essential that the high-pressure port 20 of the injection pump element 15 be arranged as close as possible to the injection valve 13. For this purpose, the injection pump element 15 together with the roller tappet 6 is oriented approximately parallel to the cylinder axis, and the injection pump element 15 is arranged in the region of the parting line between the crankcase 1 and the cylinder head 11. The motion generated by the cam 5b is transmitted by means of the plunger push rod 17 to the pump plunger 18 over a relatively great distance. These components can be designed very rigidly without any problem, so that the injection device is designed markedly rigidly at least up to the high-pressure outlet 20.

Along with the roller tappet 6 and the plunger push rod 17, a spring plate 6a arranged on the roller tappet 6 serves for the transmission of the cam motion. The relatively great distance between the camshaft 2 and the pump plunger 18 is bridged by means of the selection of appropriate dimensions of roller tappet 6, spring plate 6a, and plunger push rod 17, said plunger push rod 17 preferably serving for length adaptation.

Figure 3:
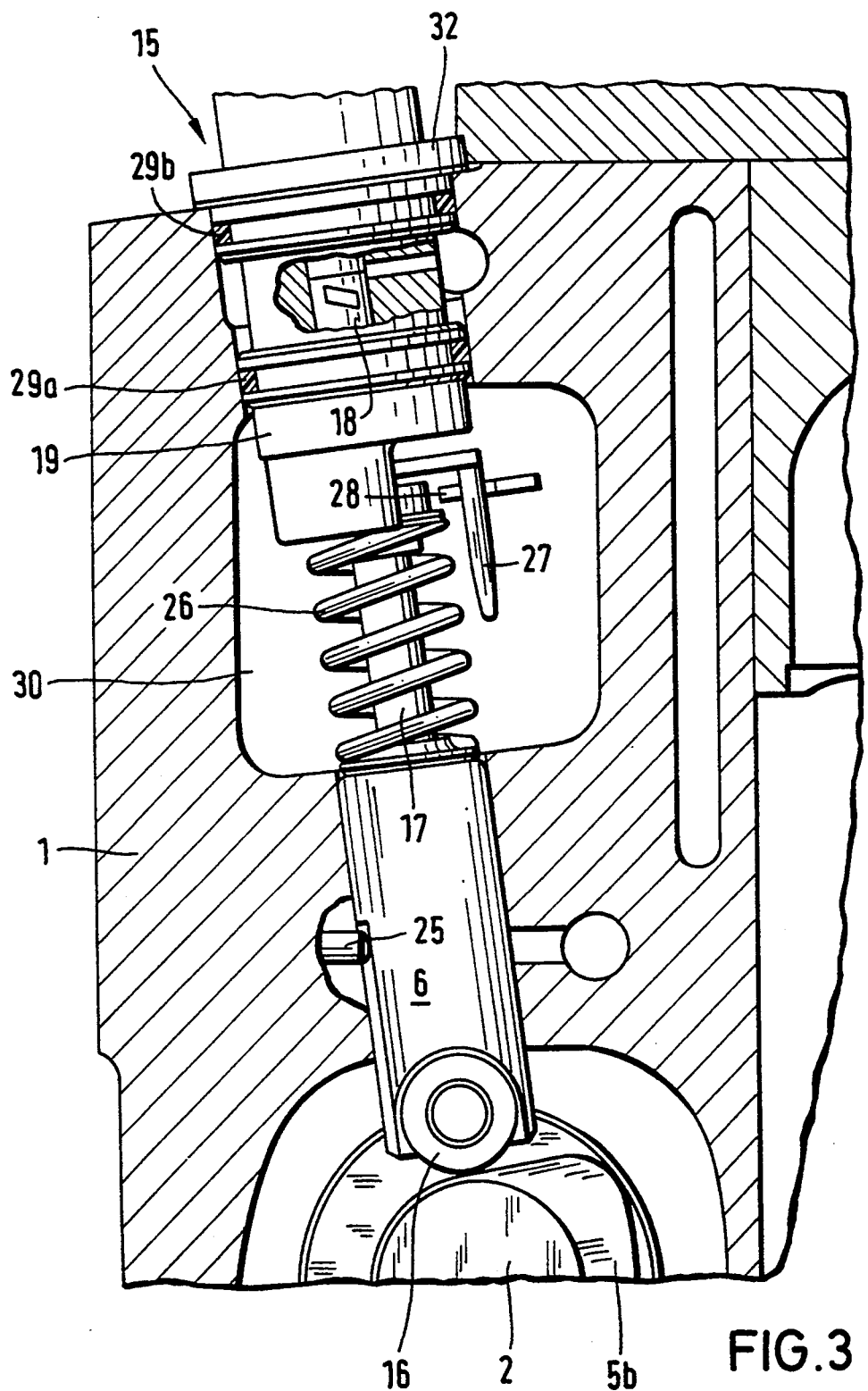
FIG. 3 shows a cross section through the crankcase in the region of the injection pump element.

FIG. 3 shows the box-like structure of the crankcase in the region of the injection pump element 15 and of the roller tappet 6. A lower girder is arranged in the region of the roller tappet 6, and an upper girder is arranged in the region of the injection pump element 15. The roller tappet 6 is, moreover, secured against rotation by means of a pin 25 arranged in the lower girder. Further, the roller tappet 6 is biased via a spring 26 against the injection pump element 15 or, respectively, the plunger bushing 19. The stroke motion of the roller tappet 6 is transmitted to the pump plunger 18 via a plunger push rod 17. Mounted on the pump plunger 18 is a control tab 27, which can be turned by a control rod 28. In this way, the quantity of fuel delivered by the injection pump element 15 can be varied. The plunger bushing 19 is inserted into the crankcase 1 of the internal combustion engine by means of seals 29a, 29b. The space 30 is wetted with oil for the lubrication of the moving parts located therein.

Figure 4:
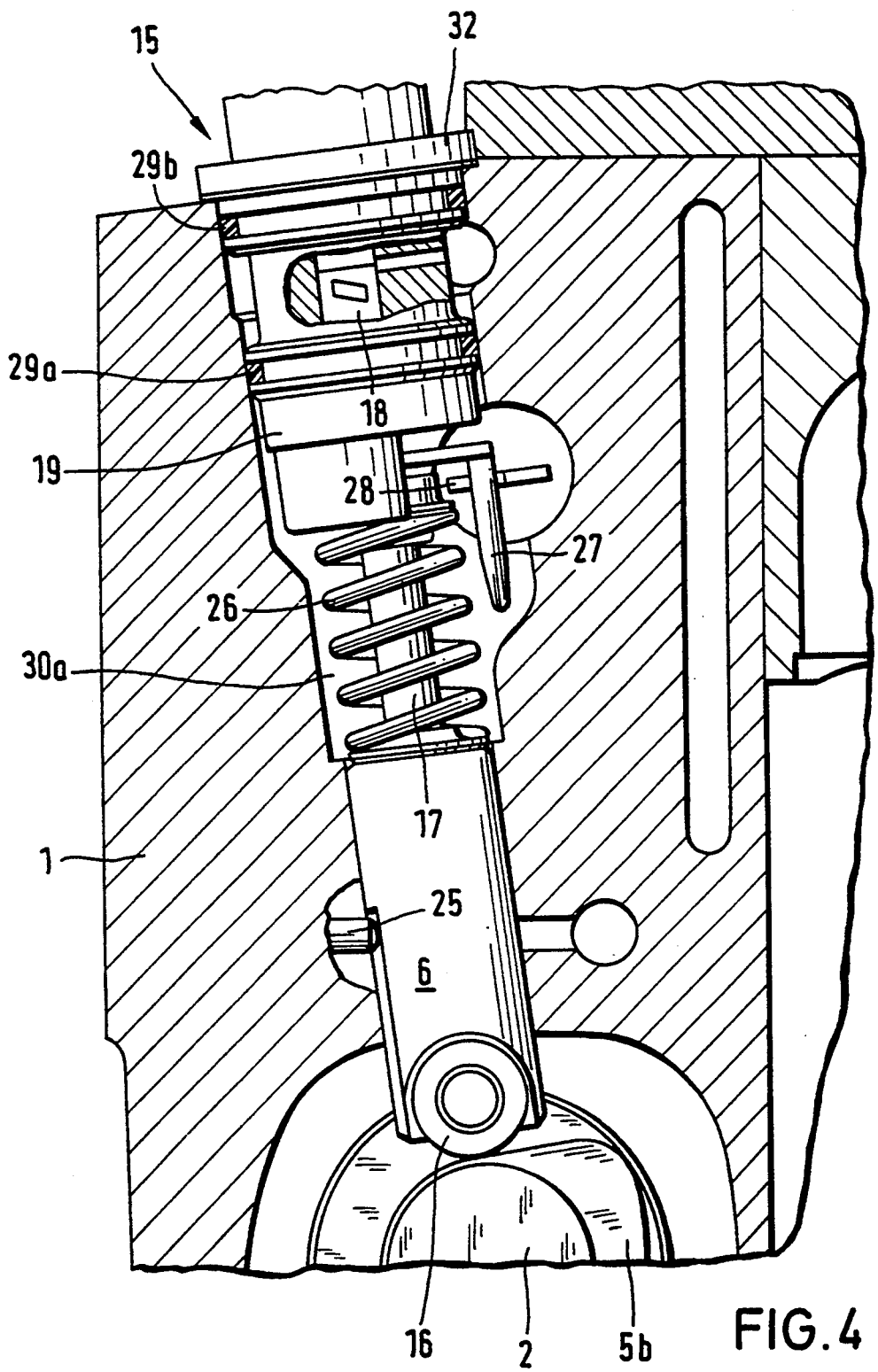
FIG. 4 shows a variant of the crankcase design in the region of the injection pump element.

In contrast to the exemplary embodiment of FIG. 3, the space 30a in FIG. 4 is reduced in size as much as possible. By this means, the side walls of the box, joining the lower girder and the upper girder, can be sized thicker, so that a gain in rigidity is achieved.

Figure 5:
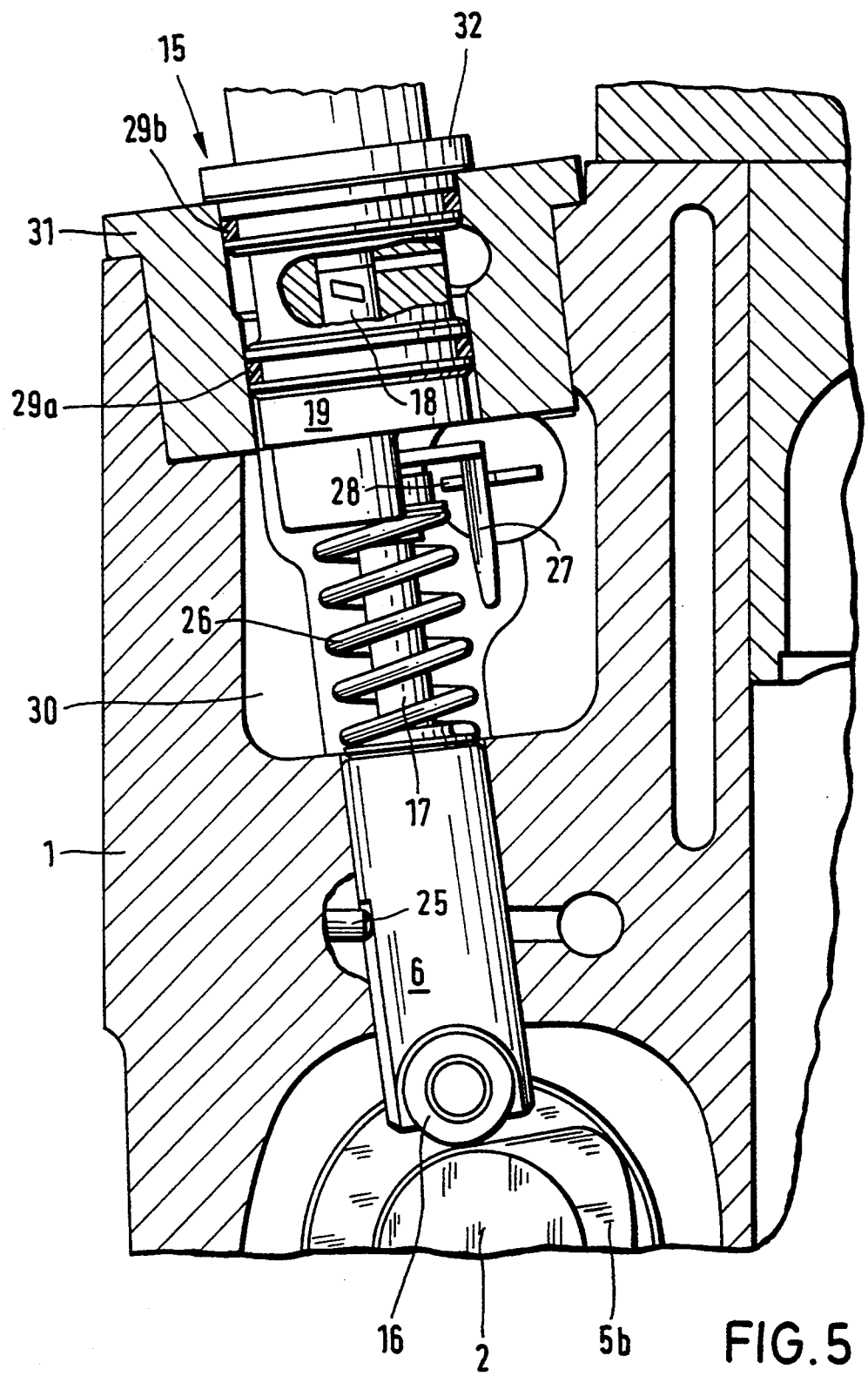
FIG. 5 shows a cross section through the crankcase with a bushing into which the injection pump element is inserted.

In the exemplary embodiment of FIG. 5, a bushing 31 is inserted into the crankcase 1, into which bushing the injection pump element 15 or, respectively, the plunger bushing 19 is inserted. The plunger bushing 19 of the injection pump element 15 lies with a flange 32, which is designed in ring form, against the bushing 31.

We claim: The embodiments of the invention in which an exclusive property or privilege is claimed are defined as follows:

1. In an internal combustion engine having a crankcase including a cylinder, a crankshaft rotatably supported in said crankcase, a piston movable in said cylinder, a connecting rod interconnecting said crankshaft and said piston, a cylinder head covering said cylinder, a camshaft, a fuel injection device having at least one injection pump element, one injection valve in said cylinder head and one injection line connecting said injection pump element and said injection valve, said camshaft having cams operable to actuate said injection pump element, said injection pump element being mounted in said crankcase with a high-pressure end protruding from said crankcase and having a roller tappet on its driven end, the combination comprising:
first and second meshing gears (3a, 3b) on said crankshaft and camshaft, respectively, whereby said camshaft is driven by said crankshaft by a single meshing of said gears,
said injection pump element (15) being oriented in substantially parallel relation to and adjacent to said cylinder (9) and extending toward said cylinder head (11), and said injection pump element (15) extending upwardly from said crankcase and having a high-pressure outlet (20) adjacent to said cylinder head (11) and, close to said injection valve (13) said crankcase being of box-like construction in the vicinity of said injection pump element (15) including an integral lower girder in which said roller tappet is installed and an integral upper girder, said upper girder having an opening in which said fuel injection element is installed.

2. The combination of claim 1 wherein said injection valve (13) is mounted in said cylinder head (11) and tilts toward said injection pump element (15).

3. The combination of claim 1 wherein said injection valve (13) is displaced from axis of said cylinder in the direction toward said injection pump element (15).

4. The combination of claim 1 and further comprising a bushing (31) in said opening in said upper girder and having a radially extending flange on top of said upper girder, wherein said injection element includes a plunger bushing (19) mounted in said bushing (31) and having a flange (32) engaging the top of said bushing (31).

5. The combination of claim 1 wherein said injection pump element (15) is designed as a solid of revolution and has a ring-shaped flange (32).

6. The combination of claim 1 wherein the wall thickness of said lower girder is at least one half the height of said roller tappet and the wall thickness of said upper girder is at least one half the height of said injection pump element.

7. The combination of claim 1 wherein said meshing gears (3a, 3b) are at the flywheel end of said engine.

8. The combination of claim 1 wherein said meshing gears (3a, 3b) have teeth designed in the long-tooth system.

9. The combination of claim 1 wherein said cylinder head (11) includes a hood (23) covering said injection valve (13).

10. The combination of claim 1 wherein said fuel injection device includes a plunger bushing (19) and said injection pump element (15) includes a pump plunger (18) operably mounted in said plunger bushing (19) said plunger bushing (19) including a flange (32) at its upper end, said flange (32) being above said crankcase (1).

11. The combination of claim 10 wherein said pump plunger (18) includes a plunger push rod (17) mounting said roller tappet (6), said pump plunger (18) and said plunger push rod (17) being formed in one piece.

12. In an internal combustion engine having a crankcase including a cylinder, a crankshaft rotatably supported in said crankcase, a piston movable in said cylinder, a connecting rod interconnecting said crankshaft and said piston, a cylinder head covering said cylinder, a camshaft, a fuel injection device having at least one injection pump element, one injection valve and one injection line connecting said injection pump element and said injection valve, said camshaft having cams operable to actuate said injection pump element, and having a roller tappet on its driven end, the combination comprising:
first and second meshing gears (3a, 3b) on said crankshaft and camshaft, respectively, whereby said camshaft is driven by said crankshaft by a single meshing of said gears,
said injection pump element (15) being mounted in the top of said crankcase in substantially parallel relation to and adjacent to said cylinder (9) and said injection pump element (15) having a high-pressure outlet (20) extending from the top of said crankcase adjacent to said cylinder head (11) and close to said injection valve (13),
said crankcase including an upper girder adjacent to the parting line between said cylinder head and said crankcase and
a bushing (31) mounted in said upper girder with a radially outward extending flange resting against the top of said upper girder,
said fuel injection element including a pump bushing (19) mounted in said bushing (31) and having a radially extending flange (32) resting on the top of said bushing (31), said injection line being connected to said pump bushing (19).

13. In an in-line internal combustion engine comprising in combination:
a crankcase, a plurality of in said crankcase,
a crankshaft rotatably supported in said crankcase,
a piston in each of said cylinders and movable therein,
a connecting rod for each piston interconnecting said pistons with said crankshaft,
a cylinder head covering said cylinders,
a pair of breathing valves for each cylinder in said cylinder head,
a camshaft,
a pair of meshing gears secured, respectively, to said camshaft and said crankshaft,
a fuel injection device for each cylinder including an injection pump element, an injection valve and an injection line interconnecting said injection pump element and said injection valve, said injection pump element including a pump plunger and a roller tappet aligned with and reciprocating said pump plunger,
said camshaft including for each cylinder a pair of valve cams operating said breathing valves and a fuel injection cam disposed between said valve cams and operating said roller tappet,
each of said injection pump elements being mounted in the top of said crankcase in substantially parallel lateral alignment with its associated cylinder, said injection pump elements extending upwardly from said crankcase with their upper ends positioned adjacent the parting line between said cylinder head and said crankcase.

14. In an internal combustion engine comprising in combination:
a crankcase;
a plurality of in-line cylinders in said crankcase;
a crankshaft rotatably supported in said crankcase,
a piston in each of said cylinders and movable therein;
a connecting rod for each piston interconnecting the latter to said crankcase;
a cylinder head structure for each of said cylinders;
a pair of breathing valves in said cylinder head structure for each of said cylinders;
a camshaft;
first and second meshing gears secured, respectively, to said camshaft and said crankshaft, whereby said crankshaft drives said camshaft by a single meshing of gears;
a fuel injection device for each cylinder including an injection pump element, an injection valve in the associated cylinder head structure and an injection line interconnecting said injection pump element and said injection valve, said injection pump element including a body extending into and supported by said crankcase, a pump plunger slidably mounted in said body and a roller tappet supported by said crankcase, said roller tappet being aligned with and operable to reciprocate said pump plunger;
each of said injection pump elements being mounted in said crankcase alongside its associated cylinder, said injection pump elements extending upwardly from the upper part of said crankcase so that the upper end of each of said injection pump elements is near its associated injection valve;
said camshaft including a set of cams for each cylinder including a pair of valve cams operating said breathing valves and a fuel injection cam engaging said roller tappet and
a plurality of axially spaced bearing discs on said camshaft including a bearing disc between each of said set of cams, whereby each of said set of cams is disposed between a pair of said bearing discs.

15. The internal combustion engine of claim 14 wherein, in each of said set of cams, said fuel injection cam is disposed between said valve cams.

16. The internal combustion engine of claim 14 wherein said injection valve is tilted toward said injection pump element.

17. The internal combustion engine of claim 14 wherein said injection valve is displaced from the cylinder axis in the direction toward said injection pump element.

18. The internal combustion engine of claim 14 wherein said crankcase includes a bushing supporting said injection pump element and wherein said injection pump element includes a flange in abutting relationship with said bushing.

19. The internal combustion engine of claim 14 wherein said injection pump element is cylindrical and includes a ring-shaped flange.

20. The internal combustion engine of claim 14 wherein said crankcase is of box-like construction in the vicinity of said injection pump element 21. The internal combustion engine of claim 20 wherein said box-like construction includes an upper girder in which said injection pump element is mounted and a lower girder supporting said roller tappet.

22. The internal combustion engine of claim 21 wherein said injection pump element includes a bushing extending above said crankcase.

23. The internal combustion engine of claim 21 wherein said injection pump element includes a plunger bushing in which said pump plunger reciprocates, wherein the thickness of said upper girder is at least one-half the height of said plunger bushing and wherein the thickness of said lower girder is at least one-half the length of said roller tappet.

24. The internal combustion engine of claim 14 wherein said crankshaft includes a flywheel at one of the axially opposite ends of said engine and wherein said meshing gears are at the flywheel end of said engine.

25. The internal combustion engine of claim 14 wherein the teeth of said meshing gears are formed in accordance with the long-tooth system.

26. The internal combustion engine of claim 14 and further comprising a hood on said cylinder head covering said injection valve.

27. The internal .combustion engine of claim 26 wherein said injection line extends under said hood through a rubber seal.

28. The internal combustion engine of claim 14 wherein said pump plunger includes a push rod formed integrally therewith, said push rod abutting said roller tappet.

* * * * *

UNITED STATES PATENT AND TRADEMARK OFFICE
CERTIFICATE OF CORRECTION

PATENT NO. : 5,419,298

DATED : May 30, 1995

INVENTOR(S) : Nolte, Albert

It is certified that error appears in the above-indentified patent and that said Letters Patent is hereby corrected as shown below:

Col. 5, line 58 (claim 1, line 25) cancel the comma (,);
   line 59, (claim 1, lilne 26), after (13)" insert a comma;

Col. 7, line 6, after "of" insert ---cylinders ---.

Signed and Sealed this

Eighth Day of August, 1995

Attest:

BRUCE LEHMAN

Attesting Officer

Commissioner of Patents and Trademarks